United States Patent [19]
Fogg et al.

[11] Patent Number: 5,618,132
[45] Date of Patent: Apr. 8, 1997

[54] PROCESS FOR RESURFACING ROADS

[76] Inventors: Roland Fogg, 1311 Kennebec Rd., Hampden, Me. 04444; Jeffrey MacDonald, 178 Mt. Hope Ave., Bangor, Me. 04401

[21] Appl. No.: 503,371

[22] Filed: Jul. 17, 1995

[51] Int. Cl.⁶ .................. E01C 7/26; E01C 7/35; C08L 95/00
[52] U.S. Cl. .................. 404/79; 106/273.1; 427/138; 427/139
[58] Field of Search .................. 106/273.1, 277, 106/278; 404/75, 76, 77, 79; 427/136, 138, 139

[56] References Cited

U.S. PATENT DOCUMENTS

| | | | |
|---|---|---|---|
| 4,256,506 | 3/1981 | Mendenhall | 404/79 X |
| 4,547,399 | 10/1985 | Fujihara, deceased et al. | 427/138 |
| 5,028,487 | 7/1991 | Kindt et al. | 428/489 |
| 5,503,871 | 4/1996 | Blacklidge et al. | 427/138 |

*Primary Examiner*—James A. Lisehora
*Attorney, Agent, or Firm*—Frederick R. Cantor, Esq.

[57] ABSTRACT

A process for resurfacing asphalt roads, includes the step of spraying a thin film of heated asphaltic material onto the road surface, and then laying an aggregate layer on the film while the film is still hot. The asphaltic material is preferably composed of from about sixty (60) to ninety-five (95) parts asphalt, about 40 to 5 parts waste oil, about one-half (½) to one and one-half (1½) parts finely divided latex, and about one-half (½) part anti-stripping agent. The material is heated to a temperature between two hundred twenty (220) degrees Fahrenheit and two hundred fifty (250) degrees Fahrenheit to achieve flowability on the road surface. Advantageously, the process can be carried out without air pollution problems or material runoff problems. The process is environmentally friendly.

17 Claims, No Drawings

PROCESS FOR RESURFACING ROADS

BACKGROUND OF THE PRESENT INVENTION

SUMMARY OF THE PRESENT INVENTION

The present invention relates to a process for resurfacing roads that have deteriorated due to traffic usage and/or environmental factors. The present invention is particularly applicable to primary and secondary roads formed of asphalt. Resurfacing of such roads can eliminate, or alleviate, various types of road deterioration, e.g. cracks, small pits, erosion of asphalt, and dislocation of aggregates from the road surface.

One current prior art practice used in resurfacing secondary asphalt roads, involves spreading a mixture of asphalt and a volatile solvent onto the degraded road surface, and then depositing a layer of aggregates onto the asphalt-solvent mixture. One volatile solvent currently used in such resurfacing is kerosene. The solvent is mixed with the asphalt in order to produce a flowable material capable of being distributed at a relatively uniform thickness layer on the road surface, i.e. a tacky layer without ridges or bare spots. Very often the mixture is heated to achieve flowability and a tacky surface.

One difficulty with the above-described process is that the solvent tends to vaporize, which then presents an air pollution problem. The 1990 Federal Clean Air Act and some state air pollution regulations require that vaporization of solvent be no greater than five (5) percent when a sample of the asphalt-solvent mixture is subjected to a distillation test at a temperature: of five hundred (500) degrees Fahrenheit. In many cases asphalt-solvent mixtures used in the past are not able to pass the distillation test.

Another difficulty with the above-described process, using an asphalt-solvent mixture, is that the flowable mixture tends to produce an undesired, runoff, from the road surface. Desired flowability of the mixture for easy spreading on the road surface is not readily controlled within desired limits, so that occasionally the material runs off the road surface onto the adjacent terrain. Such runoff can pose a ground water contamination problem if it is not controlled, or curtailed.

A second, current practice, used in resurfacing of secondary roads, involves spraying an asphalt emulsion onto the deteriorated road surface to form a tacky film; aggregates are then spread onto the tacky film to form a new road surface.

Typically, the asphalt emulsion comprises asphalt, an emulsifying agent, and water; the emulsifying agent can be a surfactant, or soap, capable of causing asphalt to disperse as globules in a continuous water phase.

One problem with road resurfacing processes, using asphalt emulsions, is that the water in the emulsion will not readily evaporate in damp or cool (45 degrees Fahrenheit) conditions making it susceptible to curing related problems.

Other problems associated with the use of emulsified asphalt in road resurfacing, are undesired air pollution (due to emission of volatile organic compounds into the atmosphere) and relatively low cohesion between the asphalt and the aggregates. The aggregates are prone to break away from the road surface due to tire-road surface friction engagements.

The present invention relates to a road resurfacing process wherein asphalt is mixed with waste lubricating oil, sometimes referred to as "specification waste oil", to form a tacky film on a road surface; aggregates are then spread on the tacky film to form a new road surface.

The process of the present invention is advantageous in that air pollution problems are greatly minimized, such that the road resurfacing operation can be performed in the relatively hot summer months, as well as in the colder months. Waste lubrication oil used in the present process has a relatively low volatile organic content, so that air pollution is not a problem, even in the hot summer months of the year.

In the preferred practice of the present invention the asphalt and waste oil are mixed with minor quantities of a finely divided rubber latex and an anti-stripping agent resistant to elevated temperatures. The flowable mixture is heated to a relatively high temperature in the range of 220 to 250 degrees Fahrenheit, such that when the mixture is sprayed onto a deteriorated road surface, the flowable material is sufficiently non-viscous to flow into small cracks and crevices in the road surface.

Aggregates are then spread onto the tacky flowable material while the material is still in a heated condition. The finely divided rubber latex retains the aggregates in place while the asphalt is cooling to the solid state; the latex particles are bonded to each other and to the aggregates aided by the anti-strip in the mixture so as to achieve a continuous non-porous road surface having a relatively good resistance against tire friction forces tending to dislodge aggregates out of the road surface.

The rubber latex particles bond to each other and to the aggregates to provide a containment network for the asphalt and the waste oil. Experience with the process of this invention indicates that the containment network prevents liquid runoff from the road surface. Further, ground water contamination is not a problem with the process of this invention.

The present invention provides a relatively economical process for resurfacing secondary roads without polluting the air or the ground water in the vicinity of the resurfaced road. Also, the invention provides a market for waste oil that is collected in large quantities, on a regular basis at recycling centers and oil-change facilities throughout the country.

In summary, and in accordance with the above discussion, the foregoing objectives are achieved in the following embodiments.

1. A process for resurfacing roads comprising:

(a) mixing asphalt, waste oil, synthetic rubber latex, and adhesive together to provide a flowable mixture comprised of from about sixty (60) percent to about ninety-five (95) percent asphalt, from about forty (40) percent to about five (5) percent waste oil, from about one-half (½) percent to about one and one-half (1½) percent latex and about one-half (½) percent anti-stripping agent;

(b) heating said flowable mixture to a temperature of from between about two hundred twenty (220) degrees Fahrenheit to about two hundred fifty (250) degrees Fahrenheit;

(c) spraying said heated flowable mixture onto a road surface to form a tacky heated film on the road surface;

(d) depositing a layer of aggregates onto said tacky heated film; and (e) running a pressure roller over the aggregate layer to cause the aggregates to be embedded in the tacky heated film.

2. The process, as described in paragraph 1, wherein step (c) is carried out so that the tacky heated film has a thickness of about fifteen-hundredths (0.15) inch prior to the time when the aggregates are deposited onto the tacky heated film.

3. The process, as described in paragraph 1, wherein step (d) is performed immediately after step (c) so that the tacky heated film does not have an opportunity to cool appreciably prior to contact with the aggregates.

4. The process, as described in paragraph 1, wherein step (b) is carried out so that the flowable mixture has a temperature of approximately two hundred twenty (220) to two hundred fifty (250) degrees Fahrenheit.

5. The process, as described in paragraph 1, wherein the synthetic rubber latex is a copolymer of styrene and butadiene.

6. The process, as described in paragraph 5, wherein the synthetic rubber latex is in the form of finely divided particles; and step (a) comprising the tub-step of uniformly distributing the rubber latex particles throughout the flowable mixture.

7. The process, as described in paragraph 5, wherein said anti-stripping agent serves as a bonding agent between the aggregates, asphalt, and the rubber latex particles.

8. The process, as described in paragraph 5, wherein step (a) is carried out so that the concentration of the rubber latex in the flowable mixture is about one half (½) to one and one-half (1½) percent.

9. The process, as described in paragraph 1, wherein the aggregates comprise crushed rock having a particle size no greater than one (1) inch.

10. The process, as described in paragraph 1, wherein the aggregates comprise sand.

11. The process, as described in paragraph 1, wherein the waste oil is selected so that when a sample of the flowable mixture is subjected to a distillation test at a temperature of five hundred (500) degrees Fahrenheit, less than five (5) percent of the waste oil in the sample will be vaporized.

12. The process, as described in paragraph 1, wherein the waste oil in the flowable mixture has a flash point measuring at least one hundred seventy-five (175) degrees Fahrenheit.

13. The process, as described in paragraph 1, wherein step (c) is carried out so that the tacky heated film has a coverage rate of about two-tenths (0.2) to three-tenths (0.3) gallon per square yard of road surface.

14. A process for resurfacing roads comprising:

(a) mixing from about sixty (60) to about ninety-five (95) parts asphalt from about forty (40) to about five (5) parts waste oil, from about one-half (½) to one and one-half (1½) parts rubber latex, and about one-half (½) part anti-stripping agent, to form a flowable mixture;

(b) heating said flowable mixture to a temperature between from about two hundred twenty (220) degrees Fahrenheit to about two hundred fifty (250) degrees Fahrenheit;

(c) spraying said heated flowable mixture onto a road surface to form a tacky heated film on the road surface;

(d) depositing a layer of aggregates onto said tacky heated film; and (e) pressing the aggregates into said tacky heated film to form a new road surface.

15. The process, as described in paragraph 14, and further comprising the step of shredding the rubber latex into latex particles prior to step (a), whereby the latex is in particulate form in the flowable mixture.

16. The process, as described in paragraph 15, wherein the rubber latex is a copolymer of styrene and butadiene in finely divided form.

17. The process, as described in paragraph 14, wherein the waste oil has a flash point measuring at least one hundred seventy-five (175) degrees Fahrenheit.

DESCRIPTION OF THE PREFERRED EMBODIMENTS OF THE PRESENT INVENTION

In a preferred process embodying the present invention a flowable heated mixture containing asphalt is spread as a thin film on a road that is to be resurfaced. While the flowable mixture is still hot, a layer of aggregates (sand, gravel or crushed rock) is laid on the hot flowable mixture film. The asphalt-containing mixture bonds to the aggregates to form a new road surface. A pressure roller is run over the aggregate layer to compact the aggregate layer and thereby increase the unit aggregate surface area in contact with the tacky mixture. The aggregates are firmly bonded to the flowable mixture, such that when the mixture cools to a solid state the aggregates are rigidly locked in fixed positions so as to form a relatively stable road surface.

The flowable mixture comprises a mixture containing from about sixty (60) to about ninety-five (95) parts asphalt, from about forty (40) to about five (5) parts waste oil, from about one-half (½) to about one and one-half (1½) anti-stripping agent rubber latex, and about one-half (½) part anti-stripping agent, on a volume percentage basis. The mixing operation is carried out with the asphalt and waste oil preheated to a relatively hot condition, in the region of about three hundred (300) degrees Fahrenheit.

The waste oil is selected to have a relatively low volatile organic compound content, as indicated by a flash point measuring at least one hundred seventy-five (175) degrees Fahrenheit. The waste oil, sometimes referred to as "specification waste oil" is a non-refined lubricating oil obtainable from oil recycling facilities. Prior to use in the present process, the waste oil can be filtered to remove any sludge, or heavy metals, that might be contained therein. The viscosity of the waste oil is not a critical factor.

The rubber latex and anti-stripping agent are mixed into the heated asphalt-oil mixture, such that rubber particulates are uniformly distributed throughout the flowable mixture.

The preferred synthetic rubber latex is a styrene-butadiene copolymer, commonly identified as SBR rubber latex. The polymerization reaction is carried out in a water emulsion containing soap, a molecular weight regulator, and an initiator for promoting polymer chain growth. Heat is applied to the emulsion to form the copolymer as a dispersion. The coagulated crumb is washed and dried to provide the latex material used in the present process. As noted, the latex (styrene-butadiene copolymer) is used in finely-divided crumb form.

The flowable heated mixture containing asphalt, waste oil, and adhesively coated latex particulates, is fed into the tank of a conventional self-propelled road coating machine for application to the road requiring resurfacing. Prior to the application of the flowable mixture to the road surface, a rotary brushing machine is advanced along the road surface to remove loose stones and other debris from the road surface.

The conventional self-propelled road coating machine comprises a horizontal tubular spray bar extending transverse to the road longitudinal dimension. The spray bar is provided with a series of regularly spaced nozzles at spaced points along the length, whereby pressurized sprays of the flowable mixture can be directed downwardly onto the road surface as the machine advances along the roadway. Typically the spray bar has a length of about nine feet, which is sufficient to span one lane of a conventional road surface.

As the machine advances slowly along the road surface, the heated flowable mixture is sprayed downwardly onto the road surface to form a uniform tacky asphaltic material on the road surface. The spacing of the spray nozzles is usually about four inches. However, the spray pattern is a divergent conical configuration that causes the individual sprays to flow together and merge into a continuous tacky film on the road surface.

As previously noted, the flowable material is in a heated condition when it is sprayed onto the road surface. Heating means on-board the distribution machine is set to maintain the flowable mixture at a temperature from between about two hundred twenty (220) degrees Fahrenheit to about two hundred fifty (250) degrees Fahrenheit. Preferably the temperature is about two hundred forty (240) degrees Fahrenheit. The higher temperature of two hundred fifty (250) degrees Fahrenheit may be used when ambient temperatures are relatively low, e.g. less than 40 degrees Fahrenheit.

The flowable mixture is heated to about 240 degrees Fahrenheit in order to promote flowability of the mixture and insuring the mixture material impinges on the road surface. The mixture material flows so as to spread out on the road surface and merge the parallel ribbons of mixture material into a continuous film on the road surface.

The flowable mixture is applied to the road surface at a rate of about two-tenths (0.2) to three-tenths (0.3) gallons per square yard of road surface. Such coverage provides a film having an average thickness of about fifteen-hundredths (0.15) inch. Such thickness is sufficient to form a good bonding layer between the aggregates and the road surface. The aggregates are embedded in the tacky heated film so that significant surface areas of the aggregates are in contact with the tacky material.

Aggregates are spread onto the tacky asphaltic film while the film is still in a heated condition, i.e. while the film temperature is at least two hundred ten (210) degrees Fahrenheit. Preferably the aggregates are laid, or deposited, onto the tacky heated surface by a machine following closely behind the machine that is used to distribute the heated flowable material on the road surface. A dump truck driven in reverse direction can be used to lay a layer of aggregates on the heated tacky film.

Various types of aggregates having particle sizes no greater than one (1) inch can be used. At one extreme, sand can be used; and at the other extreme crushed rock can be used. The thickness of the heated tacky film can be adjusted in accordance with the aggregate particle size, i.e. a larger aggregate particle size will require a thicker adhesive film, while a smaller aggregate particle size will require a thinner adhesive film. The thickness of the adhesive film can be adjusted, or controlled, by controlling the road speed of the distributing machine and/or the pressure of the flowable material.

While the adhesive film is still in a tacky condition a weighted roller is run over the aggregate layer to firmly embed the aggregates in the tacky material. When the tacky material cools to a solid condition the aggregates are locked in place.

The waste oil is used in the flowable mixture in part to give the mixture the desired flowability. The upper limit on the waste oil percentage is dictated partly by the ambient temperature and also by the temperature of the material when it is sprayed onto the road surface. The aim is to achieve the desired flowability without producing undesired runoff of the material, as might contaminate the ground water in the vicinity of the roadway.

The finely divided rubber latex particulates, along with anti-stripping agents, are used to form a containment network for the flowable material, and to also provide bonding points for the aggregates. Usually, the latex particulates will be used in a volumetric percentage of about one and one-half (1½).

The flowable material, herein described, is environmentally friendly, in that volatile organic emissions from the heated material are relatively small, e.g. less than three percent of the weight of the waste oil in the flowable mixture. Samples of the flowable material described herein pass the aforementioned distillation test that are a problem for the prior art materials using a solvent to obtain a flowable asphaltic material. The use of waste oil for flowability is a major improvement over prior art practices.

While particular material percentages and temperatures are used in the above description of a useful process embodying the invention, it will be appreciated that some variations in the composition of the flowable material and operating temperature range can be used while still practicing the invention.

The present invention, described above, relates to a process for resurfacing roads. Features of the present invention are recited in the appended claims. The drawings contained herein necessarily depict structural features and embodiments of the process for resurfacing roads, useful in the practice of the present invention.

However, it will be appreciated by those skilled in the arts pertaining thereto, that the present invention can be practiced in various alternate forms and configurations. Further, the previous detailed descriptions of the preferred embodiments of the present invention are presented for purposes of clarity of understanding only, and no unnecessary limitations should be implied therefrom. Finally, all appropriate mechanical, chemical and functional equivalents to the above, which may be obvious to those skilled in the arts pertaining thereto, are considered to be encompassed within the claims of the present invention.

What is claimed is:

1. A process for resurfacing roads comprising:

(a) mixing asphalt, waste oil, synthetic rubber latex, and anti-stripping agents together to provide a flowable mixture comprised of from about sixty (60) percent to about ninety-five (95) percent asphalt, from about forty (40) percent to about five (5) percent waste oil, from about one-half (½) percent to about one and one-half (1½) percent latex and about one-half (½) percent anti-stripping agent;

(b) heating said flowable mixture to a temperature of from between about two hundred twenty (220) degrees Fahrenheit to about two hundred fifty (250) degrees Fahrenheit;

(c) spraying said heated flowable mixture onto a road surface to form a tacky heated film on the road surface;

(d) depositing a layer of aggregates onto said tacky heated film; and (e) running a pressure roller over the aggregate layer to cause the aggregates to be embedded in the tacky heated film.

2. The process, as described in claim 1, wherein step (c) is carried out so that the tacky heated film has a thickness of about fifteen-hundredths (0.15) inch prior to the time when the aggregates are deposited onto the tacky heated film.

3. The process, as described in claim 1, wherein step (d) is performed immediately after step (c) so that the tacky heated film does not have an opportunity to cool appreciably prior to contact with the aggregates.

4. The process, as described in claim 1, wherein step (b) is carried out so that the flowable mixture has a temperature of approximately two hundred thirty (230) degrees Fahrenheit.

5. The process, as described in claim 1, wherein the synthetic rubber latex is a copolymer of styrene and butadiene.

6. The process, as described in claim 5, wherein the synthetic rubber latex is in the form of finely divided particles; and step (a) comprising the sub-step of uniformly distributing the rubber latex particles throughout the flowable mixture.

7. The process, as described in claim 5, wherein said anti-stripping agent serves as a bonding agent between the aggregates, asphalt, and the rubber latex particles.

8. The process, as described in claim 5, wherein step (a) is carried out so that the concentration of the rubber latex in the flowable mixture is about one half (½) to one and one-half (1½) percent.

9. The process, as described in claim 1, wherein the aggregates comprise crushed rock having a particle size no greater than one (1) inch.

10. The process, as described in claim 1, wherein the aggregates comprise sand.

11. The process, as described in claim 1, wherein the waste oil is selected so that when a sample of the flowable mixture is subjected to a distillation test at a temperature of five hundred (500) degrees Fahrenheit, less than five (5) percent of the waste oil in the sample will be vaporized.

12. The process, as described in claim 1, wherein the waste oil in the flowable mixture has a flash point measuring at least one hundred seventy-five (175) degrees Fahrenheit.

13. The process, as described in claim 1, wherein step (c) is carried out so that the tacky heated film has a coverage rate of about two-tenths (0.2) to three-tenths (0.3) gallon per square yard of road surface.

14. A process for resurfacing roads comprising:
   (a) mixing from about sixty (60) to about ninety-five (95) parts asphalt, from about forty (40) to about five (5) parts waste oil, from about one-half (½) to one and one-half (1½) parts rubber latex, and about one-half (½) part anti-stripping agent, to form a flowable mixture;
   (b) heating said flowable mixture to a temperature between from about two hundred twenty (220) degrees Fahrenheit to about two hundred fifty (250) degrees Fahrenheit;
   (c) spraying said heated flowable mixture onto a road surface to form a tacky heated film on the road surface;
   (d) depositing a layer of aggregates onto said tacky heated film; and
   (e) pressing the aggregates into said tacky heated film to form a new road surface.

15. The process, as described in claim 14, and further comprising the step of shredding the rubber latex into latex particles prior to step (a), whereby the latex is in particulate form in the flowable mixture.

16. The process, as described in claim 15, wherein the rubber latex is a copolymer of styrene and butadiene in finely divided form.

17. The process, as described in claim 14, wherein the waste oil has a flash point measuring at least one hundred seventy-five (175) degrees Fahrenheit.

* * * * *